(12) United States Patent
Popilian et al.

(10) Patent No.: US 7,862,228 B2
(45) Date of Patent: Jan. 4, 2011

(54) HIGH TEMPERATURE WELLBORE MONITORING METHOD AND APPARATUS

(75) Inventors: Constantin Popilian, Calgary (CA);
Dimitri Cadere, Saint Cyr l'Ecole (FR);
Jacques Wiese, Melun (FR);
Jean-Claude Ostiz, Fontenay aux Roses (FR); Anthony Veneruso, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 204 days.

(21) Appl. No.: 11/460,270

(22) Filed: Jul. 27, 2006

(65) Prior Publication Data

US 2007/0032957 A1    Feb. 8, 2007

Related U.S. Application Data

(60) Provisional application No. 60/595,694, filed on Jul. 28, 2005.

(51) Int. Cl.
*G01K 1/02* (2006.01)

(52) U.S. Cl. .................................. 374/136; 374/143

(58) Field of Classification Search ........... 374/135, 374/136, 137, 141, 143, 208; 73/152.33, 73/152.18, 152.01; 702/6, 14, 1; 166/378, 166/277, 129; 340/870.17
See application file for complete search history.

(56) References Cited

U.S. PATENT DOCUMENTS

| | | | | | |
|---|---|---|---|---|---|
| 2,183,565 | A | * | 12/1939 | Hawley | 324/372 |
| 2,191,765 | A | | 2/1940 | Lohman | |
| 2,225,668 | A | * | 12/1940 | Subkow et al. | 340/854.6 |
| 2,414,899 | A | * | 1/1947 | Rust, Jr. | 324/352 |
| 2,517,455 | A | | 8/1950 | Waters | |
| 2,636,512 | A | * | 4/1953 | Smith, Jr. | 137/590 |
| 2,676,489 | A | * | 4/1954 | Basham | 374/112 |
| 2,679,757 | A | * | 6/1954 | Fay | 374/102 |
| 2,699,675 | A | * | 1/1955 | Buck et al. | 73/152.31 |
| 2,733,605 | A | * | 2/1956 | Buck | 73/204.14 |
| 2,814,017 | A | * | 11/1957 | Doll | 324/353 |
| 2,940,039 | A | * | 6/1960 | Yost et al. | 324/174 |
| 3,028,528 | A | * | 4/1962 | Ghiselin, Jr. | 361/248 |
| 3,222,537 | A | * | 12/1965 | Mellies | 327/179 |
| 3,240,938 | A | * | 3/1966 | Hall, Jr. | 376/165 |
| 3,616,689 | A | * | 11/1971 | Scholberg | 73/152.01 |
| 3,977,345 | A | * | 8/1976 | Worthing | 114/40 |
| 3,986,393 | A | | 10/1976 | Hawley | |
| 4,178,579 | A | * | 12/1979 | McGibbeny et al. | 340/853.3 |
| 4,417,470 | A | * | 11/1983 | McCracken et al. | 374/136 |
| 4,537,067 | A | * | 8/1985 | Sharp et al. | 73/152.13 |
| 4,568,933 | A | * | 2/1986 | McCracken et al. | 340/855.3 |
| 4,695,840 | A | * | 9/1987 | Darilek | 340/10.33 |
| 4,790,378 | A | * | 12/1988 | Montgomery et al. | 166/66 |

(Continued)

FOREIGN PATENT DOCUMENTS

EP    0387846    9/1990

*Primary Examiner*—Gail Verbitsky
(74) *Attorney, Agent, or Firm*—Matthias Abrell

(57) ABSTRACT

The invention provides an apparatus for use in high temperature conditions, constituted of a downhole element and a master element connected together via a sealed connection; wherein the downhole element comprises a temperature sensor and a pressure sensor without any electronics and is embedded in a sealed housing resistant to high temperature; wherein the master element comprises electronics needed for function of the temperature sensor and the pressure sensor; and wherein the sealed connection is resistant to high temperature.

6 Claims, 3 Drawing Sheets

U.S. PATENT DOCUMENTS

| | | | |
|---|---|---|---|
| 4,803,483 A * | 2/1989 | Vandervier et al. | 340/853.2 |
| 4,870,863 A * | 10/1989 | Duncan et al. | 73/431 |
| 4,919,201 A * | 4/1990 | Bridges et al. | 166/60 |
| 5,136,525 A | 8/1992 | Cloud | |
| 5,448,477 A * | 9/1995 | Delatorre et al. | 702/6 |
| 7,098,664 B2 * | 8/2006 | Bittar et al. | 324/367 |
| 2009/0250210 A1 * | 10/2009 | Allen et al. | 166/250.15 |

* cited by examiner

HIGH TEMPERATURE WELLBORE MONITORING METHOD AND APPARATUS

FIELD OF THE INVENTION

The present invention relates to an apparatus and associated method for monitoring pressure and/or temperature in severe environments as for example high temperature.

DESCRIPTION OF THE PRIOR ART

For the moment, for high temperature application, pressure measurements are done with a vibrating wire sensor system. Basically, the vibrating sensor wire is in tension, with at least one end attached to a pressure diaphragm. The wire is driven into oscillation via an electromagnet coil. An electromagnet picks up the wire's vibration frequency that is related, in a precisely known way, to the applied pressure on the diaphragm. The electromagnetic driver and pickup are connected to surface via wires in a four-conductor cable. Interrogation electronics at the surface drive, and measure the vibrating or resonant frequency. Unfortunately, the wire sags with time which results in the measurement drifting out of calibration quickly, depending on the temperature. This device is also affected by temperature excursions due to inelastic effects of the wire's and diaphragm's metallurgy and bonding materials. The sensor's cable connections employ polymer seals that soften and fail at temperatures below 250° C. When metal seals are used they are typically a SwageLok (Trade Mark) type that employs a single ferrule. This is prone to stress corrosion failure and leaks caused by scratches in the cable. Overall the vibrating wire has very poor metrology and poor reliability. Typically, the vibrating wire system does not last more than a year in steam or geothermal applications.

In geothermal prospecting, the prior art for pressure gauges is based on a well known four-wire measurement technique with metal strain-gauge pressure sensors. This is an ancient technique in which current is supplied to the Wheatstone bridge along one pair of wires and the voltage across the bridge is measured on the remaining pair of wires. Similarly, temperature is measured by another set of four-wires. Typically, the pressure sensor is based on a resistive Wheatstone bridge deposited onto an insulator coated metal membrane. Unfortunately, the metal membrane exhibits significant corrodes. The multi-conductor cable is relatively the most expensive part of this type approach in that at least four-wires are needed for pressure and four-wires for temperature measurement. The long wires invite electromagnetic inference pickup and their parasitic inductance and capacitance de-stabilizes typical controlled voltage or current sources, meters, and electronic filters.

It is an object of the present invention to provide an apparatus or method which obviates or mitigates this drawback.

SUMMARY OF THE INVENTION

The invention provides an apparatus for use in high temperature conditions, constituted of a downhole element and a master element connected together via a sealed connection; wherein the downhole element comprises a temperature sensor and a pressure sensor without any electronics and is embedded in a sealed housing resistant to high temperature; wherein the master element comprises electronics needed for function of the temperature sensor and the pressure sensor; and wherein the sealed connection is resistant to high temperature. As it can be seen the approach of the disclosed invention consists in having no downhole electronics and by using a circuit design configuration in which robust downhole sensors are connected via a multi-conductor cable and metal sealed connections to sophisticated but low cost electronics at another location with less severe conditions. Preferably, the other location is surface. The pressure measurement is made by means of a first sensor, for example, one having a crystalline or poly-crystalline membrane having a thin-film deposited strain gauge or Wheatstone bridge. Temperature is measured by means of another sensor Resistance Temperature Detector (RTD).

Preferably, the high temperature conditions consist in high temperature below 250 degrees Celsius and/or in high pressure. Also, the sealed housing and the sealed connection are made entirely of metal without elastomeric and/or polymeric seals. By this way, the sensor are housed within a completely sealed and welded metal package. And the wire from the sensors are connected to surface via metal sealed connections that have no elastomeric and/or polymeric seals. Alternatively, elastomeric or polymeric seals could be used if such seals exhibit very high temperature resistance. These wires form a compact multi-conductor cable that connects the downhole sensors to the electronics at surface. Preferably, the sealed connection is a cable of the type seven-wires cable configuration.

The master element can further comprises a controlled current source supplying a current to the downhole element via the sealed connection and the current being alternatively switched in polarity. The surface electronics sends a controlled current to each respective sensor and receives the voltage across each sensor individually. By this means the effects of the cable's resistance upon the measurement is minimized. Electromagnetic interference, noise pickup and other disturbances, such as thermoelectric voltages (i.e., Seebeck effects due to dissimilar metal connections and temperature gradients on the cable and connections) are minimized by controlled switching of the surface current source and appropriate signal processing of the received voltages. Preferably, the controlled current source is switched using a pseudo-random code sequence and more preferably, the controlled current source is switched using a maximal-length pseudo-random code sequence of polarity plus one and/or minus one times of the current.

BRIEF DESCRIPTION OF THE DRAWINGS

Further embodiments of the present invention can be understood with the appended drawings.

DETAILED DESCRIPTION

A permanent pressure gauge system is directed to monitor the extreme downhole environmental conditions within steam injection wells or geothermal wells where operating temperatures can range up to 250° C. Compared to typical downhole reservoir monitoring systems, the absolute pressure in these applications is relatively low and the metrological requirements are modest for pressure and temperature measurement accuracy, resolution, and stability. According to a preferred embodiment of the invention, the application is focused on monitoring steam injection operations for enhanced recovery of heavy, i.e. viscous, oil, specifically for Steam Assisted Gravity Drainage (SAGD) applications. The economic drivers demand that the equipment for these applications must be very low cost, yet robust, simple to operate and reliable.

Also, typical conditions in the steam injection well environment are:

Well length/depth: up to 1000 m (currently 200 to 400 m),
Maximum Temperature: 250° C. (currently the range is 180° C. to 210° C.),
Maximum Pressure: 13.79 MPa (2000 psi) (currently the range is up to 6.89 MPa (1000 psi)).

However, conventional electronics are not generally available for this 250° C. environment. At these extreme temperatures silicon based semiconductors become intrinsic and therefore inoperative. Custom made compound semiconductors, such as silicon carbide (SiC) or gallium phospide (GaP) have been demonstrated in the laboratory but need extensive development and are too expensive for this market. In addition, the associated passive components, circuit board and packaging technology required are not available commercially.

Figure 1:
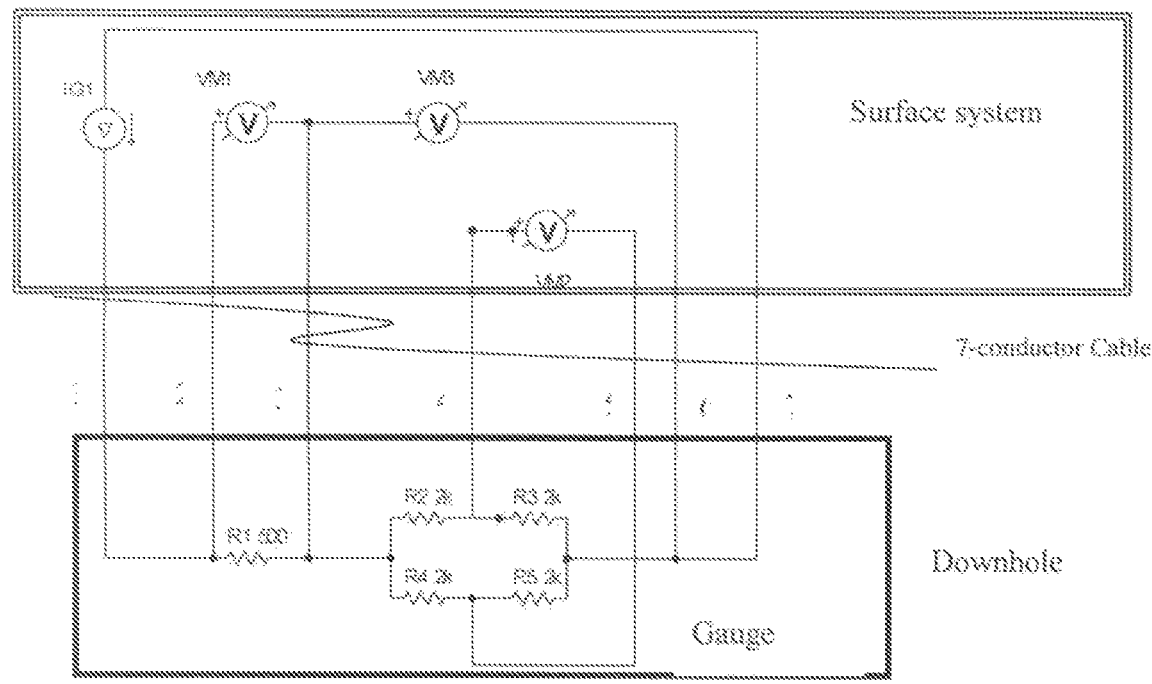
FIG. 1 shows a circuit diagram of the apparatus according to the invention.

FIG. 1 shows an embodiment of the overall electrical schematic according to the invention but without the signal processing details of the surface system. The downhole permanent gauge is made with a temperature sensor, here a Resistance Temperature Detector symbolized by R1 and with a pressure sensor, here a Wheatstone bridge symbolized by R2, R3, R4 and R5. A controlled current, IG1, is sent down to the temperature and pressure sensors via one pair of wires (1 to 7). The voltage, VM1, across the Resistance Temperature Detector is measured across wires 2 and 3. The voltmeter input VM1 is of high impedance, therefore wires 2 and 3 carry negligible current; hence the resistance of the cable has minimal effect on this voltage measurement. Since the current into the Resistance Temperature Detector and voltage across it are both known, its resistance is simply the ratio VM1/IG1. The temperature is then determined by a lookup table that was made during calibration of the Resistance Temperature Detector to determine its resistance versus temperature.

In a similar manner the voltage applied to the Wheatstone bridge is known by measuring voltage VM3 using wires 3 and 6. Hence, the input voltage to the Wheatstone bridge can be controlled to match the voltage applied during its calibration (typically, 10 volts input for the case shown of a 2 kOhm bridge with 5 mA input current). The bridge's output voltage is VM2 carried by wire pair 4 and 5. The pressure is then determined by a lookup table that was made during calibration of the pressure sensor to determine its resistance versus pressure. Typically, pressure transducers are sensitive to determine its temperature and pressure; therefore a polynomial relationship is used to determine the sensor's response as a function of both temperature and pressure during a calibration procedure made as part of its manufacture. Further, in each case for the temperature and pressure measurements, the voltage sensing wires carry negligible current; therefore these measurements are relatively insensitive to the cable's resistance.

Figure 2:
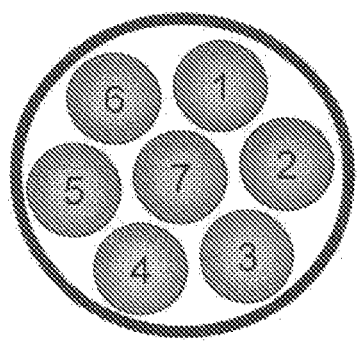
FIG. 2 shows a seven conductor cable showing compact packing within a circle.

The cable to surface is a compact and standard seven-conductor configuration illustrated in FIG. 2. Compared to multi-conductor cables with more than seven wires, this standard seven-wire cable configuration helps minimize the cable's cost and maximizes both the amount of protecting insulation and current carrying cooper within a protective metal tube (typically 0.63 centimeters (0.25 inches) outside diameter and 89 micrometers (0.035 inches) wall thickness.

In actual lab tests, surprisingly good performance has been observed so far: 14 kPa (2 psi) accuracy and no discernible drift at 250° C. during test duration of 3 weeks. This test included a 69 MPa (10 kpsi) Sapphire sensor and a Platinum Resistance Temperature Detector for temperature correction.

Another aspect of the invention is the surface system electronics and software that is designed to minimize measurement errors due to electromagnetic interference and any electrical disturbances due to unwanted voltages generated on the cable or its connections. For example, the controlled current IG1 is alternately switched in polarity to minimize errors resulting from disturbances generated by unwanted electrical effects, such as thermoelectric or Seebeck effect and galvanic voltages due to dissimilar metal contacts, temperature gradients, and different temperatures on the various electrical junctions and wires in the system. The switching of the current source is controlled by the surface system electronics and it applies the inverse switching on the received voltage measurements so the result is the measurement of the actual resistance of the respective sensor.

Figure 3A:
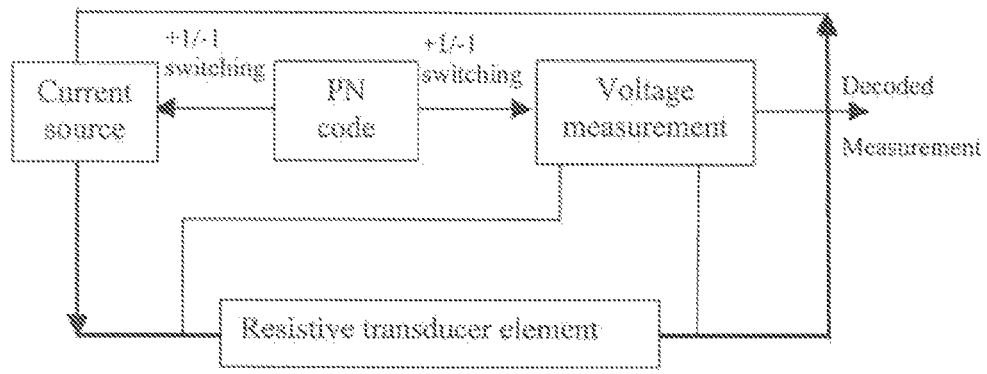
FIG. 3A shows a diagram of the pseudo-noise (PN) coded analog measurement method.
Figure 3A:
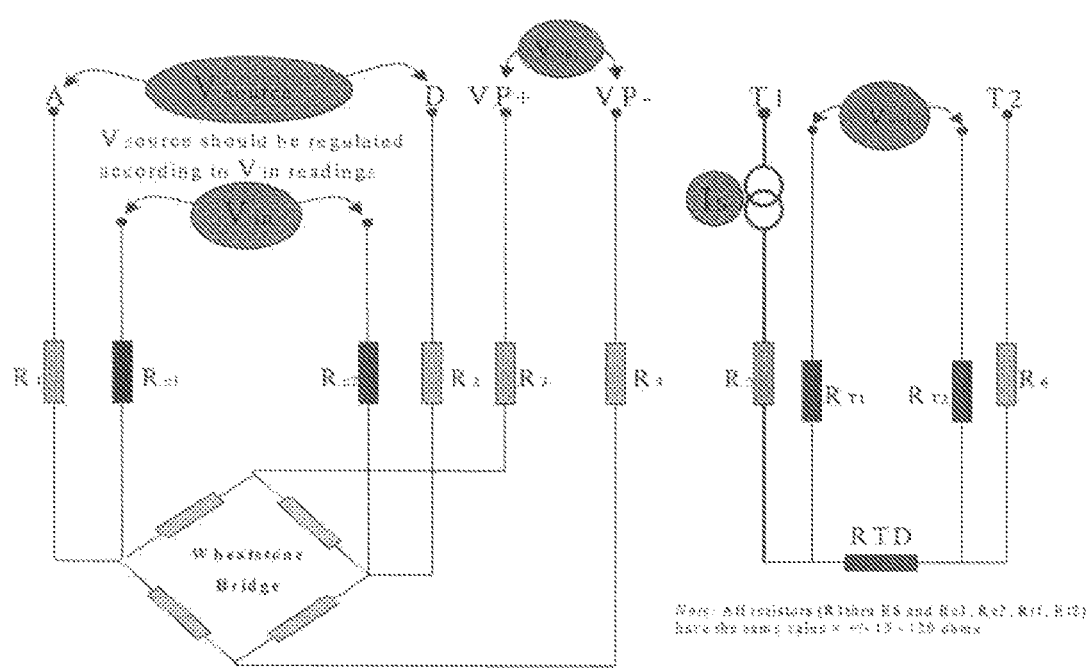
Figure 3B:
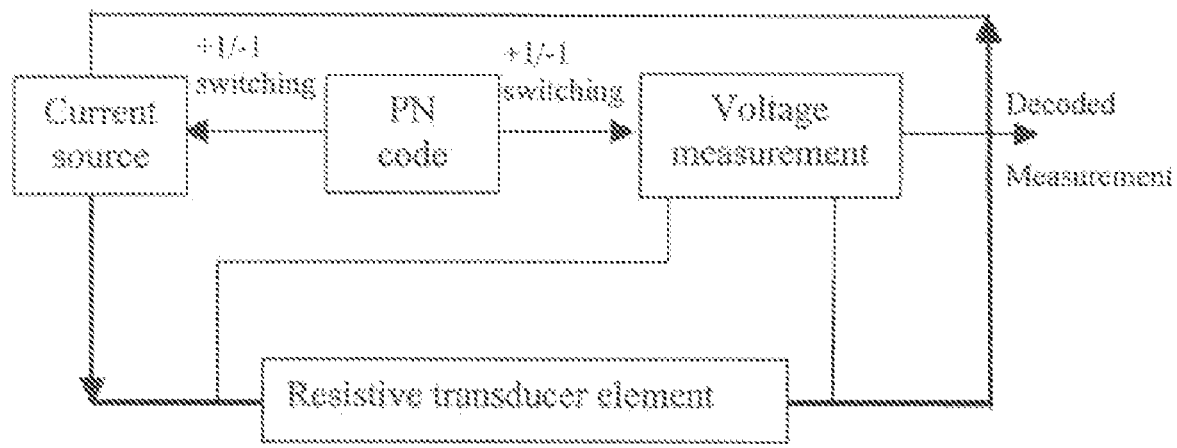
FIG. 3B shows a diagram of the pseudo-noise (PN) coded analog measurement method.
Figure 3B:
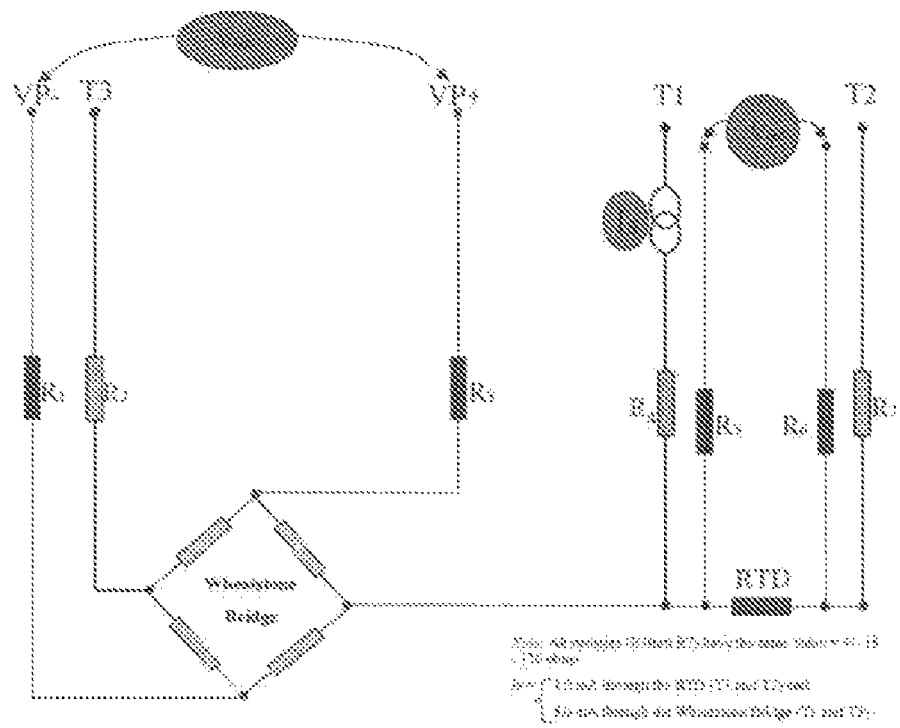

Another design feature is that the controlled current source is switched using a suitable maximal-length pseudo-random or pseudo-noise code sequence (PN) or polarity +1 and −1 times the applied current IM1. The received voltages are multiplied by the same polarity sequence to de-code the measurement into a result that is most representative of the voltage across the resistor sensor being measured. This processing method is illustrated in FIGS. 3A and 3B. This method makes use of the mathematical properties of PN codes to "spread" coherent interference, such as thermoelectric or galvanic generated voltages, electromagnetic induced inference from AC power sources, motors or solenoid wires, or switching power supplies. These interfering signals are spread across a wide frequency spectrum while the original coded signal is de-spread to yield accurate representations of the actual voltages across each respective sensor downhole. The spread-spectrum mathematical theory is the basis for mobile phones and other telecommunication and encryption devices.

The invention claimed is:

1. An apparatus comprising a downhole element and a master element connected together via a sealed connection; wherein the downhole element consists of a temperature sensor and a pressure sensor without any electronics and is embedded in a sealed housing resistant to high temperature; wherein the master element comprises electronics that control the temperature sensor and the pressure sensor; wherein the sealed connection is resistant to high temperature; wherein the sealed connection is a cable; and wherein the master element comprises further a controlled current source supplying a current to the downhole element via the sealed connection and said current being alternatively switched in polarity.

2. The apparatus of claim 1, wherein the apparatus operates in temperature conditions such that the high-temperature is below 250 degrees Celsius.

3. The apparatus of claim 1, wherein the sealed housing and the sealed connection comprise metal without elastomeric and/or polymeric seals.

4. The apparatus of claim 1, wherein the master element is at surface and the cable has a seven-wire cable configuration.

5. The apparatus of claim 1, wherein the controlled current source is switched using a pseudo-random code sequence.

6. The apparatus of claim 5 wherein the controlled current source is switched using a maximal-length pseudo-random code sequence of polarity plus one and/or minus one times of the current.

* * * * *